US007046139B2

(12) United States Patent
Kuhn et al.

(10) Patent No.: US 7,046,139 B2
(45) Date of Patent: May 16, 2006

(54) METHOD AND PARENTAL CONTROL AND MONITORING OF USAGE OF DEVICES CONNECTED TO HOME NETWORK

(75) Inventors: Roland Kuhn, Santa Barbara, CA (US); Philippe Morin, Santa Barbara, CA (US); Brian Hanson, Goleta, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 103 days.

(21) Appl. No.: 10/831,927

(22) Filed: Apr. 26, 2004

(65) Prior Publication Data
US 2005/0240959 A1   Oct. 27, 2005

(51) Int. Cl.
*G08B 1/08* (2006.01)
(52) U.S. Cl. .............................. 340/539.15; 340/573.1; 340/3.1; 340/5.2; 340/5.74
(58) Field of Classification Search ........... 340/539.15, 340/573.1, 3.1, 5.2, 5.74
See application file for complete search history.

(56) References Cited

U.S. PATENT DOCUMENTS

| 5,485,518 | A | 1/1996 | Hunter et al. | |
|---|---|---|---|---|
| 6,315,208 | B1 | 11/2001 | Doyle | |
| 6,363,434 | B1 | 3/2002 | Eytchison | |
| 6,438,618 | B1 | 8/2002 | Lortz et al. | |
| 2005/0144297 | A1* | 6/2005 | Dahlstrom et al. | ......... 709/229 |

* cited by examiner

*Primary Examiner*—Daryl C Pope
(74) *Attorney, Agent, or Firm*—Harness, Dickey & Pierce, PLC

(57) ABSTRACT

A device usage monitoring and control system for accomplishing parental monitoring and control of devices connected to a home network includes a permissions module receiving and storing control commands from a parent defining permissions with respect to one or more children. The permissions specify levels of access to devices connected to a home network and/or classifications of media content consumable via the devices. A control module grants a child access to the devices and/or media content via the devices based on the levels of access. A monitoring module monitors the child's usage of the devices and/or the child's consumption of media content via the devices, stores a related usage history, and communicates the usage history to the parent.

35 Claims, 4 Drawing Sheets

METHOD AND PARENTAL CONTROL AND MONITORING OF USAGE OF DEVICES CONNECTED TO HOME NETWORK

FIELD OF THE INVENTION

The present invention generally relates to home networks, and particularly relates to parental monitoring and control of devices connected to the home network.

BACKGROUND OF THE INVENTION

American parents are deeply concerned with the ways their children choose to spend their time. Many parents feel they are failing in the task of protecting their children from violent or sexually explicit content, in TV shows, videos, DVDs, rap songs, computer games, and in material downloaded from the Internet. A closely related concern is the large number of hours children spend absorbing electronic entertainment instead of engaging in more mentally or physically stimulating activities, such as reading, playing, or engaging in sports. Unfortunately, American parents have little time to supervise what their children are doing. For example, the typical American employee works 350 hours or more each year than the typical European. Also, unlike the typical Japanese or South Korean mother, the typical American mother works very long hours, and is often a single parent.

In response to the demand for parental control of entertainment consumed by children, a wide range of technological solutions have sprung up. Examples include the V-chip for blocking access to unsuitable TV shows, and Internet filters for blocking access to unsuitable Internet sites. However, each of these previous technological solutions covers a single type of device. Even technologically sophisticated parent must keep track of both content and technology issues with each of the media their children use separately, which is very time consuming and inconvenient. Consider violence in computer games, for example. Many parents are not aware that some computer games may contain graphic violence, with players advancing by committing murders. Furthermore, parents do not currently have any convenient way of tracking the overall patters of entertainment consumption of their children. For example, a child may be wasting 20 hours a week watching TV, watching DVDs, playing computer games, and listening to obscene rap lyrics, without the parents being aware of the total amount of time involved. Accordingly, the need remains for a way to allow parents to centrally monitor and control their children's use of devices, and this need is paramount with respect to media consumption devices. The present invention fulfills this need.

SUMMARY OF THE INVENTION

In accordance with the present invention, a device usage monitoring and control system for accomplishing parental monitoring and control of devices connected to a home network includes a permissions module receiving and storing control commands from a parent defining permissions with respect to one or more children. The permissions specify levels of access to devices connected to a home network and/or classifications of media content consumable via the devices. A control module grants a child access to the devices and/or media content via the devices based on the levels of access. A monitoring module monitors the child's usage of the devices and/or the child's consumption of media content via the devices, stores a related usage history, and communicates the usage history to the parent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
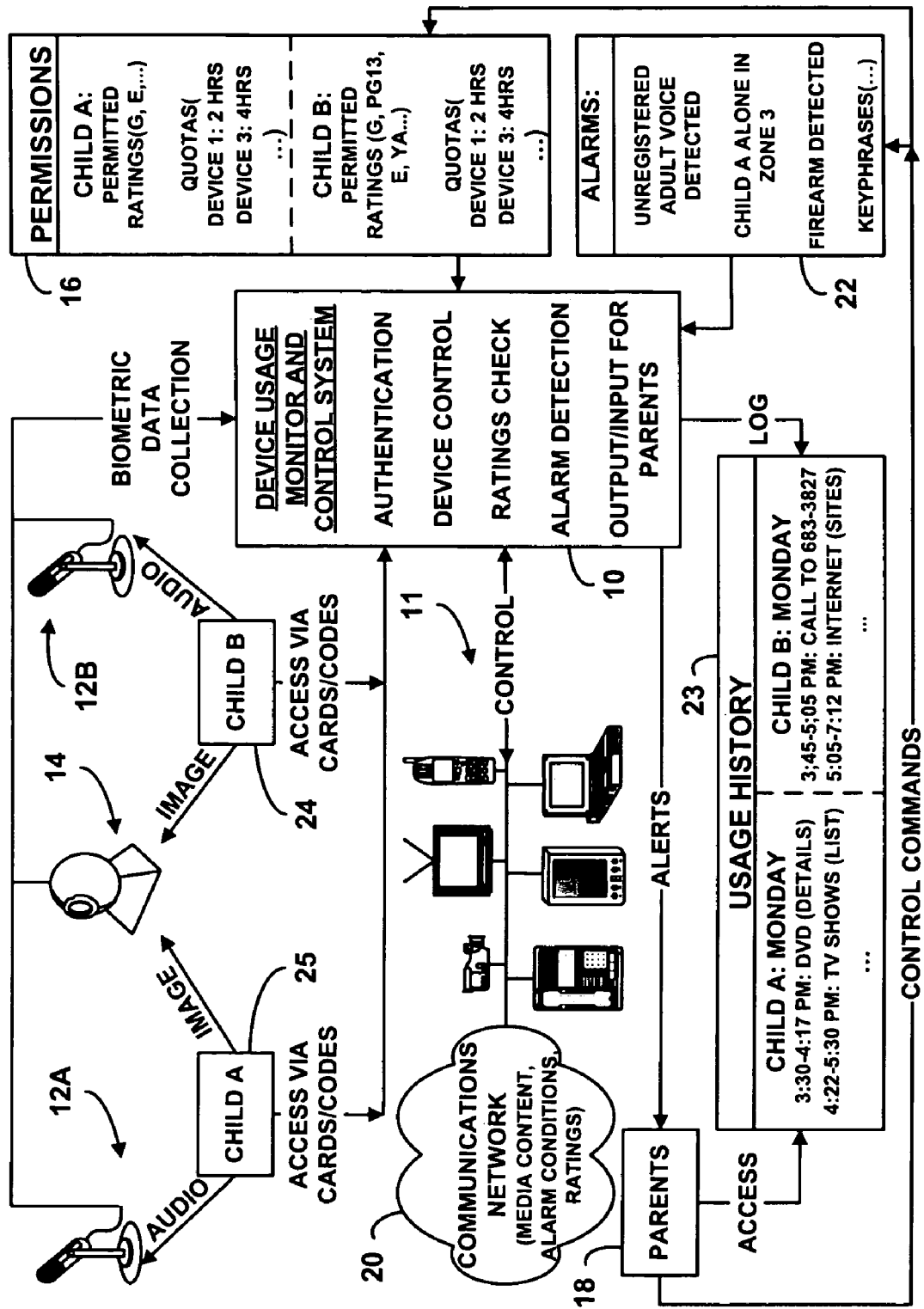
FIG. 1 is a block diagram illustrating a device usage monitoring and control system in accordance with the present invention.

As illustrated in FIG. 1, the invention provides a device usage monitoring and control system 10 in a modular form that draws on the capabilities of home networks 11 to provide parents with a way of monitoring and controlling the overall usage of entertainment and communication devices connected to the home network 11. To do this, it is necessary for the device usage monitoring and control system 10 to be aware of who uses which device when. Someone who wants to use an entertainment/communication device can authenticate himself or herself prior to use of the device.

For example, the child or parent can gain access to the device via biometric authentication by interacting with sensors, such as cameras, microphones, fingerprint sensors, iris scanners, and others types of biometric sensors. The sensors may be installed in a standalone device implementing centralized access control, installed in devices connected to the network, or installed around each room and plugged into the home network 11 as with audio inputs 12A–12B and image capture device 14.

Alternatively, authentication may involve a card, token, or code scheme involving data entry into the device usage monitoring and control system. For example, parents may issue each child with a unique card that carries a certain number of minutes of use for each device, which is periodically "recharged" by the parent and which is inserted in standalone centralized control unit prior to use. These use credits may be traded in by specifying ahead of time an amount of time the device will be used. Alternatively, the possessor of the card may "run a tab" contingent on reinserting the card and indicating that use of the device is no longer desired. The cards may contain user-specific codes, so that the system can track a particular child's usage of devices. A potential problem that arises here is that siblings may trade cards/tokens/codes between themselves, but this may not be a big problem for some families. Parents may similarly issue children with remote controls, passphrases, PINs, or other identifiers that can be combined with biometric identification.

Some families may prefer a slightly different form of passive biometric authentication, an "always aware" functionality whereby sensors let the device usage monitoring and control system know who is present in any room at any given time. Such sensors may be zone-specific audio and/or video sensors distributed about the home as with audio inputs 12A–12B and image capture device 14. The authentication occurs in the background and does not require any action by users of a device. It also has the advantage that it can prevent one user authenticating forbidden content for another—e.g., an older child watching an X-rated movie with a younger child present. Others may find this functionality too intrusive, and prefer one of the other two approaches listed above.

Another type of passive, identification that may be employed with the present invention is use of location devices permanently worn by children. Such devices, sometimes termed "ankle bracelets", have long been worn in the United States by subjects of parole or house arrest and under movement restrictions. However, some parents are using these GPS devices to track movements of their young children. Accordingly, similar devices may be used according to the present invention to assist in identifying that a child is using a device by determining locations of children in the home when a device is being used. A transponder or Bluetooth based embodiment may be used instead of or in addition to GPS to more precisely determine child locations.

In a combination of the above embodiments, children may be issued portable remote control devices for communicating with the device usage monitoring and control system to access device functions. The remote controls may have biometric identification capability, such as fingerprint sensors, that passively or actively determine who is using the remote. Also, the remote controls may have location technology (GPS, transponder, Bluetooth, etc.) that assist in determining locations of children, and the remote controls may be permanently attached to the children. Each remote may have accounts permitting the respective child to access certain devices, but the accounts may also be retained in a local database of the Device usage monitoring and control system.

Regardless of the method of authentication employed, the system 10 selectively grants access to children based on contents of permissions datastore 16. For example, each child can have a usage account stored by parents in permissions datastore 16 that can optionally define device or activity quotas. These quotas can be defined by parents 18 entering control commands, along with media content ratings approved or disapproved for the children. Then, the system 10 can monitor the child's usage of devices and either lock out a device when a quota is exceeded or alert a parent when the quota is exceeded.

The communication protocol between the device usage monitoring and control system and the entertainment/communication devices is straightforward. All devices controlled by the device usage monitoring and control system are turned off unless usage has been granted following authentication. The device usage monitoring and control system may challenge the user from time to time to refresh the authentication.

Each child can have a usage account stored by parents in permissions datastore 16 that can optionally define device or activity quotas. These quotas can be defined by parents 18 entering control commands, along with media content ratings approved or disapproved for the children. Then, the system 10 can monitor the child's usage of devices and either lock out a device when a quota is exceeded or alert a parent when the quota is exceeded.

The device usage monitoring and control system authenticates users, collects information about the usage of each device from the home network 11, controls use of the devices, and collects information about ratings of TV shows, DVD's and so on from communications network 20, such as the Internet, cable television, or telephone network. In some cases, ratings information may be obtained from metadata associated with the media content. Public ratings may not be available for all types of content—for instance, radio shows or images on a digital camera or from the Internet. Software capable of analyzing and rating such content is rapidly becoming available, and could be installed in the home network 11. Alternatively or in addition, the system 10 can screen the content, such as closed captions for a television program, for predefined key phrases associated with ratings. Image features can also be screened. Biometric and other filters may be used to distinguish between key-phrases and/or images of the children or home environment and those produced by the media content.

In a passive monitoring embodiment with distributed sensors in zones of the home, parents may wish to define alarming events in alarming event datastore 22. Accordingly, key phrases spoken by children or visitors may result in an alarm being triggered and an alert being sent to parents. Key images, such as gang tattoos, may be screened similarly. Age and gender detection can further be employed to screen unwanted visitors, and if an undesired visitor's voice, face, or other biometric has previously been stored biometrically, this visitor may be excluded accordingly. A proprietary source of ratings and alarming events may be provided to parents via the Internet, for example, when configuring the permissions and alarming events. Accordingly, the latest ratings, slang phrases, gang tattoos, known sex offenders and the like can be selected by parents who would otherwise lack the requisite knowledge and/or resources.

The device usage monitoring and control system 10 also compiles device usage into a usage history datastore 23 that can be read by the parents as a log. Apart from generating a log, the system sends the parents alerts when a child has violated one of the rules set by the parents or when an alarming event has occurred. An alert may take the form of an email, voice mail, a blinking light in some prominent place in the house, or others. In an example of use, child B 24 (the daughter) has exceeded the number of minutes she is allowed to talk on her cell phone to a friend during the time she is supposed to be doing her homework. There are many other possible types of rule infringements that can be tracked by the system; the most obvious type is accessing unsuitable content. The parents, for example, may respond by using control commands to bar the daughter from use of the phone or entertainment devices for 24 hours. This example assumes that the daughter's cell phone is lined to the home network 11 in some way.

The way in which the invention is used by the parents may vary considerably. Many parents may not bother checking the log regularly, but will set global limits and then rely on the device usage monitoring and control system to stop unauthorized access automatically. Some parents may choose to make access to entertainment devices a reward for finishing homework or performing other tasks; once the task is done, the parents may unlock the devices for the child in question (but not for siblings who have not yet performed their duties).

Another aspect of the invention is that it can be used by content producers to track entertainment consumption patterns within households in much more detail than is currently possible. For instance, it may be possible to spot correlations between preferences involving different media. Accordingly, if teenagers who watch show A like band B, then a commercial on show A involving band B is likely to be effective. Usage of such data may require the permission of the home owners, and might be paid for by charging less for content.

Figure 2:
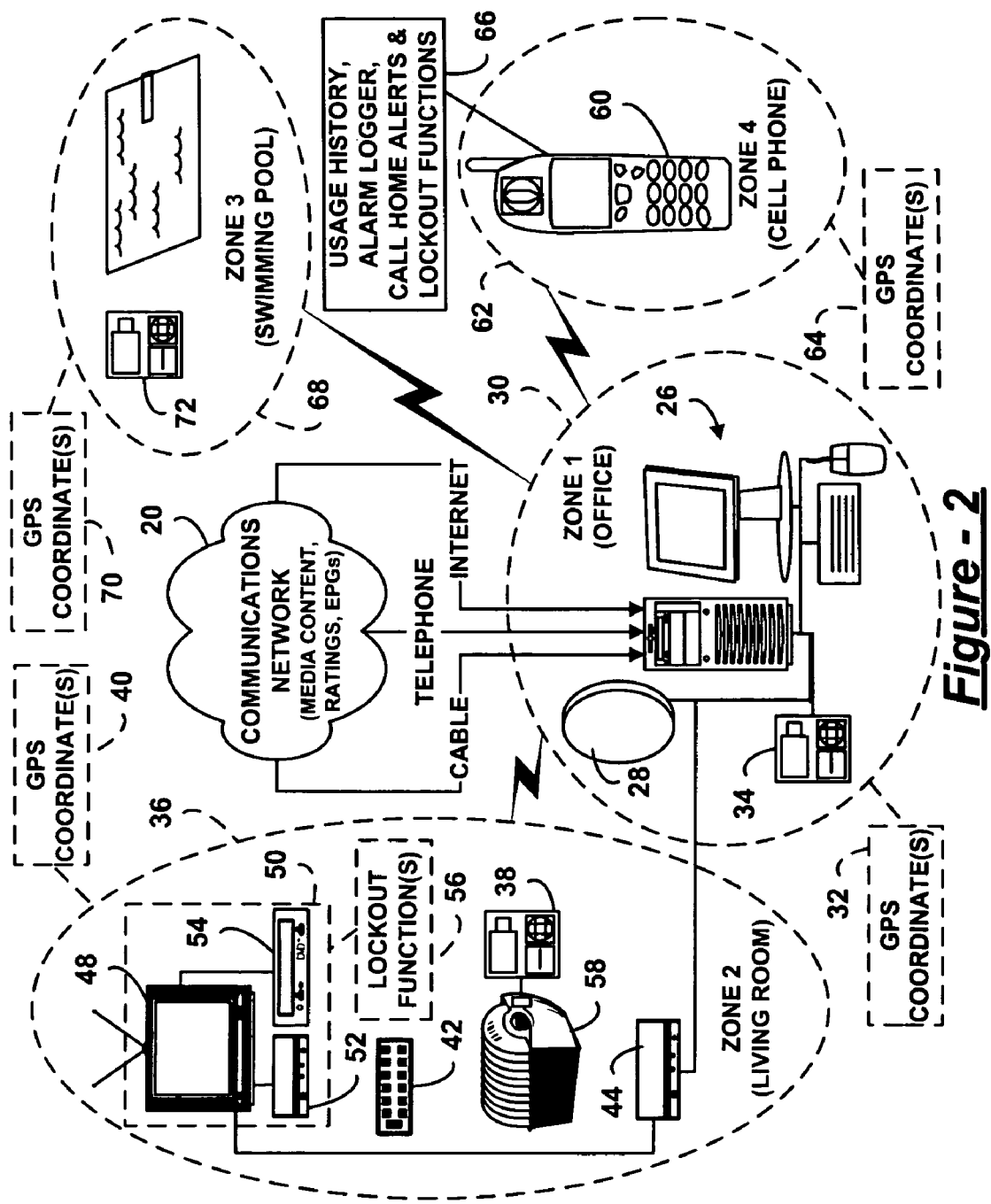
FIG. 2 is a block diagram illustrating zone definitions in accordance with the present invention.

Turning now to FIG. 2, the device usage monitoring and control system may be integrated into a home network having predefined zones according to range of sensors and/or coordinates. For example, the system is implemented on a personal computer 26 acting as a server of media content via a wireless router 28 and/or a LAN in a first zone 30 defined as the "Office". The zone may be defined based on GPS coordinates 32, or based on sensor range of audio inputs, image capture mechanisms, transponders or others located in zone 30. An intercom 34 with an audio input, video input, and card reader may therefore be present in zone 30 and allow users to access the system on the personal computer 26. In some embodiments, the personal computer is connected to communications network 20 and acts as a gate keeper that serves specific media content to a specific device of the home network upon the request of a user authorized to consume that content. Thus, cable television, telephone, and Internet may be controlled. In other embodiments, the system may not control a child's access to specific content, but may merely monitor the child's consumption of content. In this case, the system may alert parents and/or lock a child out of a related device.

A second zone 36 is also defined by range of intercom 38 or other sensors, and/or by coordinates 40. A child may request access to a device in the form of television 48 and media content in the form of channel via remote control 42 and cable box 44, or via intercom 38, and these requests may be transmitted to the system in zone 30. Also, the child's image and voice may be collected by intercom 38, and/or the child's fingerprint may be collected by remote control 42, and these biometrics may be transmitted to the system in zone 30. Further, the child's pass phrase or access code may be collected by the intercom, 38 or remote control 42 and transmitted to the system in zone 30. Routing protocols identify the source zone of these data to the system. Also, the child's transponder or GPS bracelet may transmit the child's location to the system, and the system can compare these coordinates to the known coordinates 40 of zone 36. Accordingly, identities and locations of children are known, and the system can grant or deny the child access to the device and/or channel based on the defined permissions and the known media content ratings.

Devices 50 in zone 36, such as television 48, game station 52, and DVD player 54, may be adapted to turn on or off when instructed by the system, and therefore have lockout functionality 56. Some devices 50 may be able to scan content of recorded media inserted by a child and transmit the identity of the media and ratings thereof to the system. However, even if a device is not compliant in this way, a secure library 58 of recorded media may be implemented to assist parents in controlling their children's consumption of media content. Parents may add a disk to the library by affixing a unique bar code sticker provided with the library to a disk and sliding it into a locked position in the library 58, which then scans the bar code and registers the disk. Then, children can check out a disk and use it in devices 50. Disks are always added at one end of the locking mechanism so that they can be scanned when added and progressively moved down to another end of the mechanism as other disks are removed. A carousel may also be employed, so that any disk can be moved into scanning position as needed. The identity of the media checked out by a child is known because the child must select a disc to remove so that the locking mechanism will release it. The system may assume that the media is in use until the child returns it, which can encourage children to put things back where they belong when they are done using them.

In addition to the previously described alarming event detection, one or more defined zones may be declared off limits to a child in one or more circumstances. For example, a third zone 68 presenting a danger to an unsupervised child of young age may be declared off limits for that child unless accompanied by an approved guardian. If the child wears a GPS bracelet, then the coordinates 70 of the zone may be used to determine if the child is present. Alternatively or additionally, a passively monitoring intercom 72 may identify the young child, an older sibling, a babysitter, or a parent. If the intercom must be used for a child to physically access the zone, then the young child may be prevented from accessing the zone accept under particular circumstances. Quotas for access of a zone may also be imposed.

A portable device 60, such as a cell phone, may define its own zones, as with fourth zone 62. The portable device 60 may have GPS tracking capability and periodically or upon request transmit its coordinates 64 home to the system. The portable device 60 may also have embedded monitoring and usage control functionality 66. For example, it may be adapted to track its usage history, detect and log alarming events, call home periodically and/or upon detection of an alarming event, and lockout some or all use in response to a control command or a usage quota observed onboard. In the case of a cell phone, calling an emergency number or a parent's phone number may never be locked out, and may also be allowed without counting the usage against the usage quota, which is primarily imposed to limit calling of friends. This usage quota may be imposed independently of any quota imposed by a related calling plan.

Figure 3:
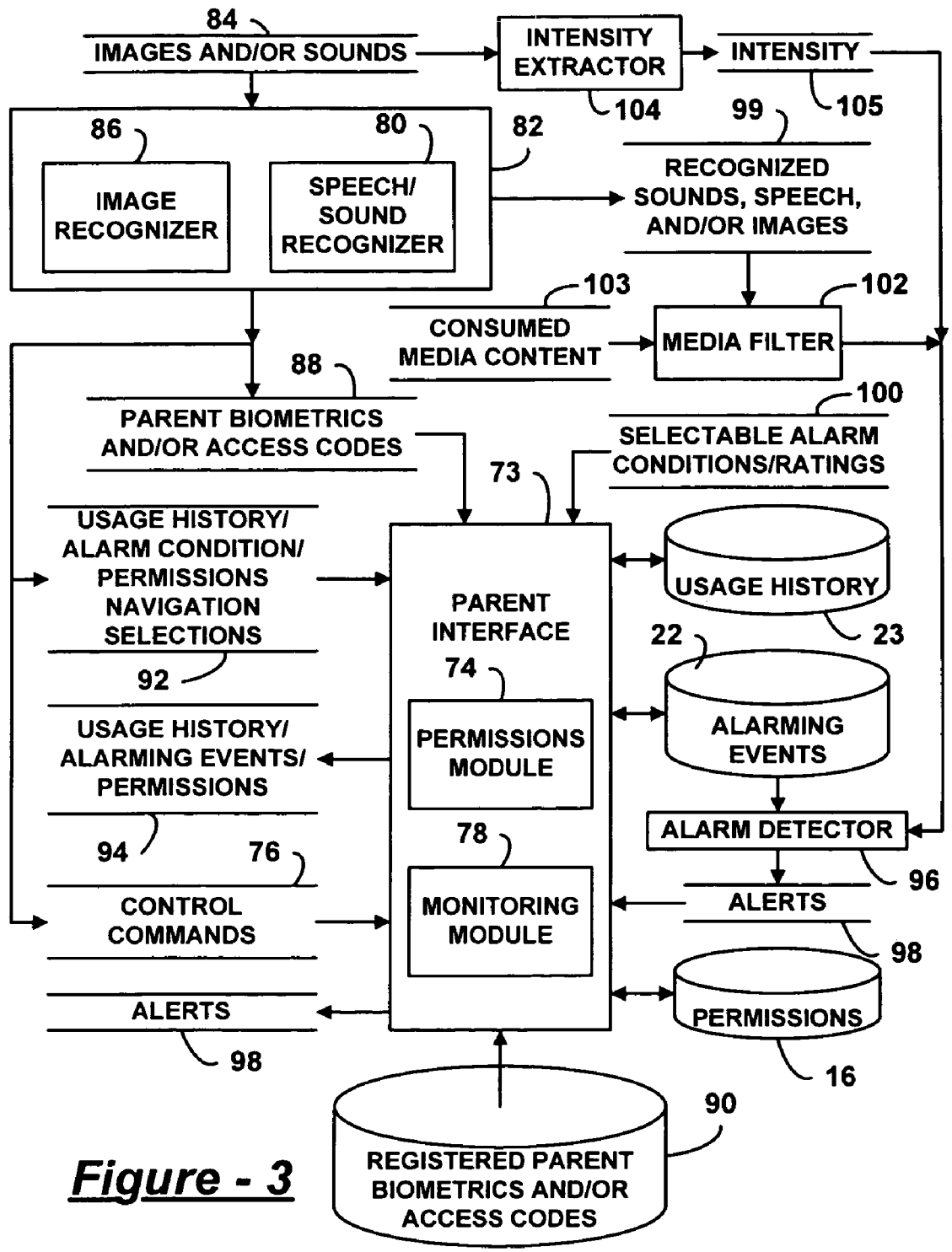
FIG. 3 is a block diagram illustrating dataflow between system components in accordance with the present invention to achieve a convenient parent interface.

System components providing a parent interface are illustrated in FIG. 3. This parent interface 73 includes a permissions module 74 allowing an authorized parent to browse and define contents of permissions datastore 16 and alarming events of datastore 22 via control commands 76. The parent interface 73 also includes a monitoring module 78 allowing an authorized parent to browse contents of usage history datastore 23. A parent may authorize himself or herself by entering an access code in the form of a PIN or pass phrase that may be spoken aloud and interpreted by speech recognizer 80, or entered via a card swipe, keypad, or other input device. A parent may also authorize himself or herself biometrically by voice, image, or other biometric input to recognizers 82. Accordingly, input images and/or sounds 84 may be continuously recognized by image recognizer 86 and/or speech recognizer 80. Age and/or gender detection may be included in recognizers 82. Accordingly, parent biometrics and/or access codes 88 are received by the device either continuously or as part of an interaction dialogue, and compared to contents of registered parent users data store 90.

Thereafter, assuming the parent is authorized, the parent is permitted to navigate the usage history, alarm conditions, and permissions via navigation selections 92, which may be input via speech recognizer 80 or any other supported input mechanism. The usage history, current alarming events, and current permissions 94 are continuously communicated to the parent during the editing process. Control commands 76 that accomplish these edits may be input via speech recognizer 80 or any other supported input mechanism. The parent may select predefined alarm conditions and or ratings 100 provided by a source of such information during the editing process.

During subsequent operation, alarming events detected by alarming event detector 96 result in alarm-related alerts 98 being communicated to the parents. Alarming events may be detected by comparing recognized sounds, speech, and/or images 99 to key sounds, key phrases, and/or images correlated with alarming events. Alarming event detector 96 may also apply an audio intensity threshold correlated with an alarming event to input audio by using intensity extractor 104 to extract the intensity 105 of the audio. Extremely loud sounds, such as gunfire, generally exceed the ability of audio sensors. Thus, the upper limit of the ability to sense audio intensity may be one such threshold. Recognized speakers can also be compared to speakers associated with alarming events, as can age and/or gender of unrecognized speakers.

A media filter 102 may be provided to alarm detector 96 in order to screen out audio input and images produced by children, parents, and the environment. The media filter 102 may use knowledge about what media content 103 is being consumed in a zone to eliminate conforming input from consideration. Alternatively or in addition, parent and child biometrics may be used to identify input that is not produced by consumed media. Also, envirometrics may be recorded for a zone based on input passively received when media is not being consumed in the zone and/or when no one is in the zone. Thus, firearms present in a permanently displayed painting of a hunting scene can be screened out and not interpreted as a danger.

Figure 4:
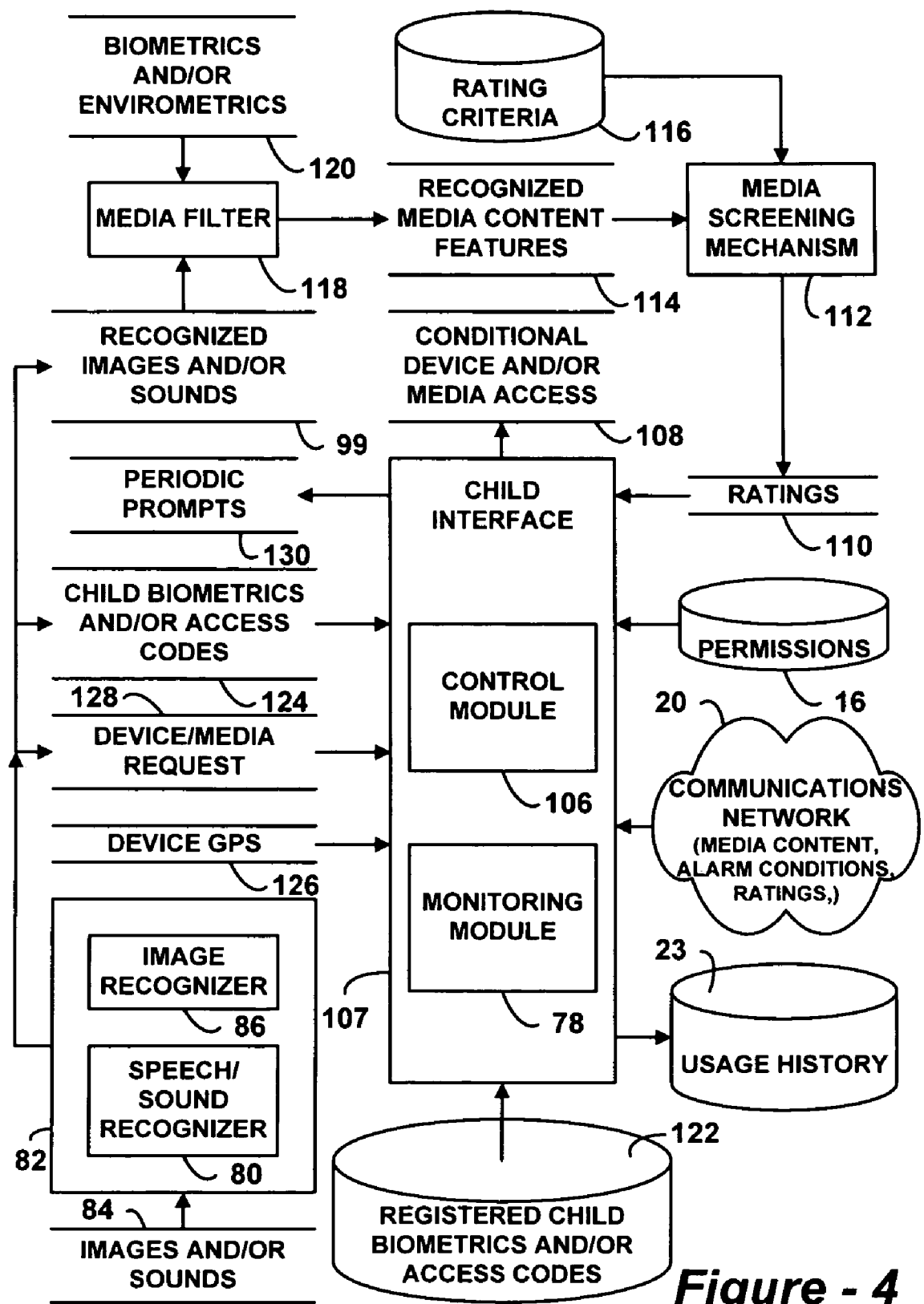
FIG. 4 is a block diagram illustrating dataflow between system components in accordance with the present invention to achieve robust monitoring of and control of device usage via a flexible child interface.

Turning to FIG. 4, a child interface 107 includes monitoring module 78 and control module 106. Control module 106 grants an authorized child conditional device and/or media access 108 based on contents of permissions datastore 16 and ratings 110 for the media content obtained from communications network 20, media screening mechanism 112, or from the media content. Media screening mechanism 112 receives recognized media content features 114 and compares them to predefined rating criteria 116 which may be periodically provided to parents in an updatable fashion in software patch form over the Internet. Media filter 118 receives recognized sounds, speech, and/or images 99 from a zone and filters out audio and video input not produced by media consumed in the zone. Parent/child biometrics and envirometrics 120 can be used to filter out those sources of input, as can knowledge of the media being consumed. Envirometrics may be recorded for a zone based on input passively received when media is not being consumed in the zone and/or when no one is in the zone. Thus, firearms present in a permanently displayed painting of a hunting scene can be screened out and not interpreted as media content. Alternatively, media screening mechanism can get a direct feed of features recognized solely from the media content being consumed.

A child may authorize himself or herself by entering an access code in the form of a PIN or pass phrase that may be spoken aloud and interpreted by speech recognizer 80, or entered via a card swipe, keypad, or other input device. A child may also authorize himself or herself biometrically by voice, image, or other biometric input to recognizers 82. Accordingly, input images and/or sounds 84 may be continuously recognized by image recognizer 86 and/or speech recognizer 80. Age and/or gender detection may be included in recognizers 82. Accordingly, child biometrics and/or access codes 124 are received by the device either continuously or as part of an interaction dialogue, and compared to contents of registered child users data store 122. Alternatively or additionally, a code, such as device GPS 126, transmitted by a tracking device worn by the child, may serve to authorize the child.

Once the child is authorized, he or she may communicate a request 128 to access a device and/or media content. In turn, control module 106 determines whether the child has permission to access the device and/or media content and selectively grants access accordingly. Monitoring module 78 then tracks the usage of the device by the child and stores details about device usage in datastore 23, including start and stop times and details about the use of the device, such as media content consumed. In some embodiments, an active monitoring scheme may be employed that includes issuing periodic prompts 130 to the child for an identifying response via the device being used, an intercom in the zone, or other mechanism. The identifying response, such as a code or biometric, is used to confirm continued use of the device to consume the media content by the child. If the child is no present, or if another child answers, then the device usage is terminated. In a passive monitoring scheme, siblings sharing another child's access may have the access charged against their quotas. If one of plural children detected in a zone does not have access to the content in their own right, both in quota and in rating, then access may be denied to all children in the zone.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device usage monitoring and control system for accomplishing parental monitoring and control of devices connected to a home network, comprising:

a permissions module receiving and storing control commands from a parent defining permissions with respect to at least one child, wherein the permissions specify levels of access to devices connected to a home network;

a control module granting the child access to the devices based on the levels of access; and a monitoring module monitoring the child's usage of the devices, storing a usage history respective thereto, and communicating the usage history to the parent, wherein said permissions module is adapted to allow the parent to specify a level of access that completely denies the child access to one of the devices under specific conditions, and said control module is adapted to determine fulfillment status of the conditions and completely deny the child access to the device when the conditions are fulfilled.

2. The system of claim 1, wherein said control module is adapted to identify a user based on an input user-specific code.

3. The system of claim 2, wherein said control module is adapted to obtain the user-specific code recorded in a user-specific recording medium.

4. The system of claim 1, wherein said control module is adapted to obtain a device-specific use credit recorded in a user-specific recording medium, and authorize a user with respect to the device based on the device-specific use credit.

5. A device usage monitoring and control system for accomplishing parental monitoring and control of devices connected to a home network, comprising:
- a permissions module receiving and storing control commands from a parent defining permissions with respect to at least one child, wherein the permissions specify levels of access to at least one of devices connected to a home network or classifications of media content consumable via the devices;
- a control module granting the child access to at least one of the devices or media content via the devices based on the levels of access;
- a monitoring module monitoring at least one of the child's usage of the devices or the child's consumption of media content via the devices, storing a usage history respective thereto, and communicating the usage history to the parent; and
- audio inputs distributed throughout a home implementing the home network, wherein the audio inputs define zones of the home.

6. The system of claim 5, further comprising a speech recognizer receiving and recognizing speech respective of zones of the home.

7. The system of claim 6, further comprising an alarming event detector comparing recognized speech to key phrases correlated with alarming events.

8. The system of claim 7, further comprising a media filter provided to said alarming event detector and filtering out recognized speech produced by audio media consumed via a device.

9. The system of claim 6, further comprising a media screening mechanism receiving recognized speech from a zone correlated with a device in use by the child to access audio media, and comparing the recognized speech to key phrases correlated with classifications of media content.

10. The system of claim 9, further comprising a media filter provided to said media screening mechanism and filtering out recognized speech not produced by audio media consumed via a device.

11. The system of claim 5, further comprising a speaker identifier receiving speech and recognizing speakers respective of zones of the home.

12. The system of claim 11, further comprising an alarming event detector comparing a recognized speaker to speakers correlated with alarming events.

13. The system of claim 12, further comprising a media filter provided to said alarming event detector and filtering out speech produced by audio media consumed via a device.

14. The system of claim 5, further comprising an alarming event detector applying an audio intensity threshold correlated with an alarming event to input audio.

15. A device usage monitoring and control system for accomplishing parental monitoring and control of devices connected to a home network, comprising:
- a permissions module receiving and storing control commands from a parent defining permissions with respect to at least one child, wherein the permissions specify levels of access to at least one of devices connected to a home network or classifications of media content consumable via the devices;
- a control module granting the child access to at least one of the devices or media content via the devices based on the levels of access;
- a monitoring module monitoring at least one of the child's usage of the devices or the child's consumption of media content via the devices, storing a usage history respective thereto, and communicating the usage history to the parent; and
- image capture devices distributed throughout a home implementing the home network, wherein the image capture devices define zones of the home.

16. The system of claim 15, further comprising an image recognizer receiving and recognizing images respective of zones of the home.

17. The system of claim 16, further comprising an alarming event detector comparing at least one feature of a recognized image to image features correlated with alarming events.

18. The system of claim 17, further comprising a media filter provided to said alarming event detector and filtering out images produced by visual media consumed via a device.

19. The system of claim 16, further comprising a face recognizer receiving images and recognizing faces respective of zones of the home.

20. The system of claim 16, further comprising a media screening mechanism receiving a recognized image from a zone correlated with a device in use by the child to access visual media, and comparing at least one feature of the recognized image to image features correlated with classifications of media content.

21. The system of claim 20, further comprising a media filter provided to said media screening mechanism and filtering out recognized images not produced by visual media consumed via a device.

22. A device usage monitoring and control system for accomplishing parental monitoring and control of devices connected to a home network, comprising:
- a permissions module receiving and storing control commands from a parent defining permissions with respect to at least one child, wherein the permissions specify levels of access to at least one of devices connected to a home network or classifications of media content consumable via the devices;
- a control module granting the child access to at least one of the devices or media content via the devices based on the levels of access; and
- a monitoring module monitoring at least one of the child's usage of the devices or the child's consumption of media content via the devices, storing a usage history respective thereto, and communicating the usage history to the parent;
- wherein said control module is adapted to identify a user by capturing a biometric of the user and comparing it to a reference biometric.

23. The system of claim 22, wherein said control module is adapted to authorize a user by performing speaker authentication respective of a user speech input providing a speech biometric of the user.

24. The system of claim 23, wherein the user speech input contains information relating to control of a device, and said control module is adapted to recognize the information and control the device according to the information contingent on authentication of the user based on the speech biometric.

25. The system of claim 23, wherein said control module is adapted to authorize the user based on a combination of fingerprint authentication respective of a user fingerprint biometric and speaker authentication.

26. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access; and a monitoring module monitoring at least one of the child's usage of the devices or the child's consumption of media content via the devices, storing a usage history respective thereto, and communicating the usage history to the parent;

wherein said permissions module is adapted to store quotas respective of at least one of the child's use of a device or the child's consumption of media content via the devices, and said monitoring module is adapted to communicate alerts to parents when quotas are exceeded.

27. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access;

a monitoring module monitoring at least one of the child's usage of the devices or the child's consumption of media content via the devices, storing a usage history respective thereto, and communicating the usage history to the parent; and an alarming event detector adapted to detect alarming events based on at least one of received audio input or a captured image, wherein said monitoring module is adapted to communicate alerts to parents when alarming events are detected.

28. The system of claim 27, further comprising a media filter provided to said alarming event detector and filtering out at least one of audio or images produced by media consumed via a device.

29. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access;

a monitoring module monitoring at least one of the child's usage of the devices or the child's consumption of media content via the devices, storing a usage history respective thereto, and communicating the usage history to the parent; and a media screening mechanism receiving at least one of audio or video input and comparing at least one of recognized audio or recognized video to at least one of key phrases or image features correlated with classifications of media content.

30. The system of claim 29, further comprising a media filter provided to said media screening mechanism and filtering out at least one of recognized sounds or recognized images not produced by audio media consumed via a device.

31. The system of claim 29, further comprising a media screening mechanism receiving media and comparing closed captions to key phrases correlated with classifications of media content.

32. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access; and a monitoring module monitoring at least one of the child's usage of the devices or the child's consumption of media content via the devices, storing a usage history respective thereto, and communicating the usage history to the parent;

wherein said control module is adapted to periodically prompt the child for an input sufficient to confirm the child's continued use of a device.

33. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access; and a monitoring module monitoring at least one of the child's usage of the devices or the child's consumption of media content via the devices, storing a usage history respective thereto, and communicating the usage history to the parent;

wherein said control module is adapted to honor a lowest level of access of all children identified in a zone of a house implementing the home network when granting access to at least one of devices or media content in that zone.

34. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access;

a monitoring module monitoring at least one of the child's usage of the devices or the child's consumption of media content via the devices, storing a usage history respective thereto, and communicating the usage history to the parent; and a source of ratings information correlating classifications of media content with media content available via the devices, wherein said source of ratings information is at least one of continuously updated or periodically updated.

35. A device usage monitoring and control system for accomplishing parental monitoring and control of devices connected to a home network, comprising:

a permissions module receiving and storing control commands from a parent defining permissions with respect to at least one child, wherein the permissions specify levels of access to at least one of devices connected to a home network or classifications of media content consumable via the devices;

a control module granting the child access to at least one of the devices or media content via the devices based on the levels of access;

a monitoring module monitoring at least one of the child's usage of the devices or the child's consumption of media content via the devices, storing a usage history respective thereto, and communicating the usage history to the parent; and a source of selectable alarm conditions providing information about at least one of key phrases or image features and related causes for alarm, wherein said source of selectable alarm conditions is at least one of continuously updated or periodically updated.

* * * * *

UNITED STATES PATENT AND TRADEMARK OFFICE
CERTIFICATE OF CORRECTION

PATENT NO. : 7,046,139 B2
APPLICATION NO. : 10/831927
DATED : May 16, 2006
INVENTOR(S) : Roland Kuhn et al.

It is certified that error appears in the above-identified patent and that said Letters Patent is hereby corrected as shown below:

Title Page; (54) Title: and Column 1, line 3

"METHOD AND PARENTAL CONTROL AND MONITORING OF USAGE OF DEVICES CONNECTED TO HOME NETWORK" should be --METHOD FOR PARENTAL CONTROL AND MONITORING OF USAGE OF DEVICES CONNECTED TO HOME NETWORK--

Signed and Sealed this

Seventeenth Day of October, 2006

JON W. DUDAS
*Director of the United States Patent and Trademark Office*